United States Patent [19]
Yamamoto

[11] Patent Number: 5,432,772
[45] Date of Patent: Jul. 11, 1995

[54] SUPPORTING MECHANISM FOR OPTICAL PICKUP

[75] Inventor: Hiroshi Yamamoto, Kanagawa, Japan

[73] Assignee: Sony Corporation, Tokyo, Japan

[21] Appl. No.: 195,562

[22] Filed: Feb. 14, 1994

Related U.S. Application Data

[63] Continuation of Ser. No. 976,277, Nov. 13, 1992, abandoned.

[30] Foreign Application Priority Data

Nov. 15, 1991 [JP] Japan .................. 3-326737

[51] Int. Cl.$^6$ .................. G11B 17/30; G11B 23/00
[52] U.S. Cl. .................. 369/219; 369/215; 369/263
[58] Field of Search ............... 369/215, 219, 258, 263, 369/44.14, 244, 249, 251, 253

[56] References Cited

U.S. PATENT DOCUMENTS

| | | | |
|---|---|---|---|
| 4,449,216 | 5/1984 | Kudo et al. | 369/255 |
| 4,823,336 | 4/1989 | Inada et al. | 369/215 |
| 4,914,647 | 4/1990 | Ono et al. | |
| 4,932,019 | 6/1990 | Bessho | 369/249 |
| 5,025,436 | 6/1991 | Crain et al. | 369/77.2 |
| 5,027,334 | 6/1991 | Yamanaka et al. | 369/13 |
| 5,070,494 | 12/1991 | Emoto et al. | 369/12 |
| 5,091,898 | 2/1992 | Bessho et al. | 369/77.2 |
| 5,101,398 | 3/1992 | Iuoue et al. | 369/251 |
| 5,115,423 | 5/1992 | Maeda et al. | 369/112 |
| 5,122,998 | 6/1992 | Mizuno et al. | 369/13 |
| 5,124,971 | 6/1992 | Nomura et al. | 369/215 |
| 5,132,944 | 7/1992 | Berg | 369/13 |
| 5,172,367 | 12/1992 | Hinotani | 369/215 |
| 5,187,702 | 2/1993 | Takahashi | 369/215 |
| 5,305,299 | 4/1994 | Maeda | 369/215 |

FOREIGN PATENT DOCUMENTS

| | | | |
|---|---|---|---|
| 56-74865 | 6/1981 | Japan | 369/219 |
| 58-115659 | 7/1983 | Japan | 369/219 |
| 61-267972 | 11/1986 | Japan | 369/244 |
| 61-269267 | 11/1986 | Japan | 369/244 |
| 61-280037 | 12/1986 | Japan | 369/215 |
| 63-69076 | 3/1988 | Japan | 369/244 |
| 0102078 | 5/1988 | Japan | 369/244 |
| 0251975 | 10/1988 | Japan | 369/244 |
| 1-86375 | 3/1989 | Japan | 369/244 |
| 64-89068 | 4/1989 | Japan | |
| 4-90172 | 3/1992 | Japan | 369/244 |
| 4-139654 | 5/1992 | Japan | |

OTHER PUBLICATIONS

U.S. Ser. No. 07/967,999 filed Oct. 26, 1992 to Kiyoshi Ohmroe et al.
U.S. Ser. No. 07/888,982 filed May 26, 1992 to Kiyoshi Ohmore et al.
U.S. Ser. No. 07/889,494 filed May 27, 1992 to Kiyoshi Ohmore et al.
U.S. Ser. No. 07/966,682 filed Oct. 26, 1992 to Kiyoshi Ohmori et al.
U.S. Ser. No. 07/900,860 filed Jun. 18, 1992 to Tamotsu Maeda.

Primary Examiner—John H. Wolff
Assistant Examiner—Brian E. Miller
Attorney, Agent, or Firm—Limbach & Limbach; Philip M. Shaw, Jr.

[57] ABSTRACT

A supporting mechanism for moving an optical pickup device radially with respect to an optical recording medium includes a first guide shaft, a second guide shaft mounted parallel to the first guide shaft, first and second pairs of guide rollers provided on a lateral side of an optical block of the optical pickup device mounting an object lens radiating a light beam to the optical recording medium for being abutted on the first guide shaft for permitting the optical block to be moved only in a direction around the first guide shaft and in a direction along the axis of the first guide shaft, a guide roller stably mounted on an opposite lateral surface of the optical block and abutting on the second guide shaft for preventing rotation of the optical block around the first guide shaft towards a side of the optical block provided with the object lens, and a guide roller provided on the opposite lateral surface of the optical block via an elastic member and for being thrust against the second guide shaft for resiliently biasing the optical block towards the first guide shaft.

8 Claims, 5 Drawing Sheets

SUPPORTING MECHANISM FOR OPTICAL PICKUP

This is a continuation of application Ser. No. 07/976,277, filed on Nov. 13, 1992, now abandoned.

BACKGROUND OF THE INVENTION

1. Field of the Invention

This invention relates to a supporting mechanism or system for supporting an optical pickup device for writing and/or reading information signals on or from an optical recording medium, such as an optical disc, in a recording and/or reproducing apparatus, so that the optical pickup device may be supported for movement radially of the optical recording medium.

2. Description of Related Art

An optical recording medium, such as an optical disc, has been proposed as a recording medium for information signals. The information signals are written on and/or reproduced from the optical recording medium by the recording and/or reproducing apparatus.

The recording and/or reproducing apparatus for recording and/or reproducing information signals using the optical disc is made up of a rotating and driving device for rotationally driving the optical disc and an optical pickup device for radiating the light beam to the optical disc for writing and/or reading information signals on or from the disc. That is, in the recording and/or reproducing apparatus, the optical disc is rotationally driven by the rotating and driving device, while being irradiated with the light beam for writing and/or recording the information signals.

The optical pickup device is made up of a light source, such as a laser diode, an optical device for conducting the light beam from the light source to a predetermined light path, and an object lens for converging and radiating the light beam on the major surface of the disc which is its signal recording surface.

The optical pickup device of the recording and/or reproducing apparatus is supported by a supporting mechanism of the optical pickup device, in such a manner that, as shown in FIG. 1, the major surface of the optical disc 33 carrying the signal recording layer thereon is faced by its object lens 105a.

The light source and the optical device are housed within an optical block 104. The object lens 105a is supported with respect to the upper surface of the optical block 104 by means of an object lens driving unit 105 so that a converging point of the light beam is located at all times on the optical disc 33 which is rotationally driven by the rotating and driving unit while being subject to offsetting and deviation from the horizontal. The object lens driving unit 105 supports the object lens 105a for movement in a direction perpendicular to the major surface of the optical disc 33, that is in a direction along the optical axis of the object lens 105a, and in a direction normal to the optical axis of the object lens 105a, that is in a direction along the radius of the optical disc 33.

The supporting mechanism for the optical pickup device is comprised of first and second guide shafts 101, 102, mounted parallel to each other, and a plurality of supporting members mounted on the optical block 104 and abutted on the first and second guide shafts 101, 102 for supporting the optical block 104 with respect to the guide shafts 101, 102.

The supporting members mounted on the optical block 104 are comprised of first and second guide rollers 108, 109 mounted at a front side on a lateral surface of the optical block 104, third and fourth guide rollers, not shown, mounted at a rear side on the same lateral surface of the optical block 104, and fifth and sixth guide rolls 112, 115 mounted on the opposite lateral surface trace of the optical block 104.

The first and second guide rolls 108, 109 are rotatably supported by supporting shafts 108a, 109a, set on the optical block 104 at an angle of 90° relative to each other. The third and fourth guide rollers (not shown) are rotatably supported by supporting shafts, not shown, set on the optical block 104 at an angle of 90° relative to each other. The first guide roller 108 and the third guide roller are mounted with their axes parallel to each other. The second guide roller 109 and the fourth guide roller are also mounted with their axes parallel to each other. The first and second guide rollers 108, 109 are caused to bear against the first guide shaft 101 for engaging with the first guide shaft 101 in-between. The third and fourth guide rollers are also caused to bear against the first guide shaft 101 for engaging with the first guide shaft 101 in-between. That is, the optical block 104 is position-controlled by the first to fourth guide rollers so that only rotation of the optical block 104 about the first guide shaft 101 as a center of rotation and a movement along the axis of the first guide shaft 101 are allowed.

The fifth guide roller 112 is rotatably mounted on a supporting shaft 112a set on the opposite lateral surface of the optical block 104 obliquely upwardly at an angle of 45°. The fifth guide roller 112 is caused to bear against the second guide shaft 102.

The sixth guide roller 115 is rotatably supported on a supporting shaft 115a set on a spring plate 113 mounted by a set screw 114 on the same opposite lateral surface of the optical block 104. The sixth guide roller 115 is supported by a supporting shaft 115a which is mounted obliquely downwardly at an angle of 90° with respect to the supporting shaft 112a supporting the fifth guide roller 112.

The fifth and sixth guide rollers 112, 115 are caused to bear on the second guide shaft 102 for engaging with the second guide shaft 102. The sixth guide roller 115 is biased by spring plate 113 towards the second guide shaft 102 as shown by arrow a in FIG. 1. Under the force of reaction to the thrusting force of the sixth guide roller 115 against the second guide shaft 102, the optical block 104 is resiliently biased towards the first guide shaft 101, as shown by arrow b in FIG. 1.

The optical block 104 may be moved along the first and second guide shafts 101, 102, with the guide rollers in rolling contact with respect to these guide shafts. The direction of possible movement of the optical block 104 along the guide shafts 101, 102 is coincident with the radial direction of the optical disc rotationally driven by the rotating and driving unit.

The recording and/or reproducing apparatus, comprising the optical pickup device supported by the supporting system for the optical pickup device as described above, modulates the information signals supplied from outside the apparatus for recording the information signals on the optical disc by means of the optical pickup device. The recording and/or reproducing apparatus also demodulates the signals read out by the recording and/or reproducing apparatus for reproducing the information signals recorded on the optical disc 33.

In the above-described supporting system for the optical pickup device, the optical pickup device 104 tends to be rotated upwardly around the first guide shaft 101 as a center of rotation, as indicated by an arrow c in FIG. 2, under vibrations or impacts propagated from outside the recording and/or reproducing apparatus. At this time, the fifth guide roller 112 is separated from the second guide shaft 102. This is because the force of inertia produced in the optical block 104 under the above-mentioned impacts etc. becomes larger than the force of bias exerted by the spring plate 113.

If the optical block 104 is rotated in this manner upwardly around the first guide shaft 101, there is a risk that the object lens driving device 105 of the object lens 105a may contact with the optical disc 33. If the object lens 105 etc. contacts the optical disc 105 while the disc 33 is kept in rotation, not only is the smooth recording and/of reproduction of the information signals on or from the disc 33 impeded, but also the disc 33 or the object lens 105a etc. may be contaminated of damaged.

On the other hand, there are occasions wherein an adjustment opening etc. is provided in the lower surface of the optical block 104 in order to permit position adjustment within the optical block 104 of optical devices, not shown, provided within the optical block. Such position adjustment of the optical devices etc. via the adjustment opening is effected, using an adjustment jig, such as a screwdriver, from the underside of the optical block 104, while the optical disc 33 is kept in rotation. If, during such position adjustment, the optical block 104 is biased upwardly by the adjustment jig, there is a risk that the optical block 104 will be rotated around the first guide shaft 101, so as to be moved towards the optical disc 33, as shown in FIG. 2. In such case, the object lens driving device 105 of the object lens 105 may contact with the optical disc 33.

OBJECTS AND SUMMARY OF THE INVENTION

It is an object of the present invention to provide a supporting system for an optical pickup device which is free from the above-mentioned problems inherent in the conventional system.

It is another object of the present invention to provide a supporting system for an optical pickup device in which, even when the optical pickup device is moved under vibrations or impacts or for performing adjustment operations, the optical pickup device is prevented from being contacted with the optical disc to prevent the optical pickup device or the optical disc from being contaminated to assure satisfactory recording and/or reproduction of information signals on or from the optical disc.

According to the present invention, there is provided a supporting mechanism for supporting an optical pickup device for movement radially of an optical recording medium, comprising a first guide shaft, a second guide shaft mounted parallel to the first guide shaft, first supporting members provided on a lateral side of an optical block of the optical pickup device mounting an object lens on an upper surface of the optical block for radiating a light beam to the optical recording medium, the first supporting members including a pair of first and second guide rollers rotatably mounted on a front side on a lateral surface of the optical block and pair of third and fourth guide rollers rotatably mounted on a rear side on the lateral surface of the optical block, the first supporting members controlling the position of the optical block by being abutted on the first guide shaft for permitting the optical block to be moved only in a direction around the first guide shaft and in a direction along an axis of the first guide shaft, a second supporting member provided on an opposite lateral surface of the optical block, the second supporting member including a fifth guide roller rotatably mounted on an opposite side of the optical block from the first, second, third and fourth guide rollers for abutting on the second guide shaft to prevent rotation of the optical block around the first guide shaft towards the upper surface of the optical block, and a third supporting member provided on the opposite lateral surface of the optical block via an elastic member, the third supporting member controlling the position of the optical block by being abutted on the second guide shaft for permitting the optical block to be moved only in a direction around the first guide shaft which moves the optical head away from the optical recording medium and in a direction along an axis of the first guide shaft, the third supporting member including a sixth guide roller positioned adjacent the upper surface of the optical block for being thrust against the second guide shaft for resiliently biasing the optical block in a direction from the second guide shaft towards the first guide shaft.

In a preferred embodiment, the elastic member is a spring plate having one proximal end mounted on a lower surface portion on the opposite lateral surface of the optical block, the spring plate being mounted for extending along a spring supporting projection formed on the opposite lateral surface of the optical block up toward the upper surface of the optical block. The sixth guide roller is supported for rotation around a supporting shaft set on another end of the spring plate.

In the supporting system for the optical pickup device according to the present invention, the optical block of the optical pickup device, mounting an object lens for radiating a light beam to the optical recording medium, is rendered movable only around the first guide shaft and along the axis of the first guide shaft, by the first supporting member provided on a lateral side of the optical block. Besides, the optical block is controlled in its rotation around the first guide shaft towards the side of the block provided with the object lens by the second supporting member provided on the opposite lateral surface of the optical block being caused to bear on the second guide shaft provided for extending parallel to the first guide shaft.

Other objects and advantages of the present invention will become apparent from the following description.

DETAILED DESCRIPTION OF THE PREFERRED EMBODIMENTS

The supporting mechanism for the optical device according to the present invention is applied to a recording/reproducing apparatus for recording and/or reproducing information signals using an optical recording medium, such as an optical disc, and is adapted for movably supporting the optical pickup device in the recording/reproducing apparatus.

Figure 1:
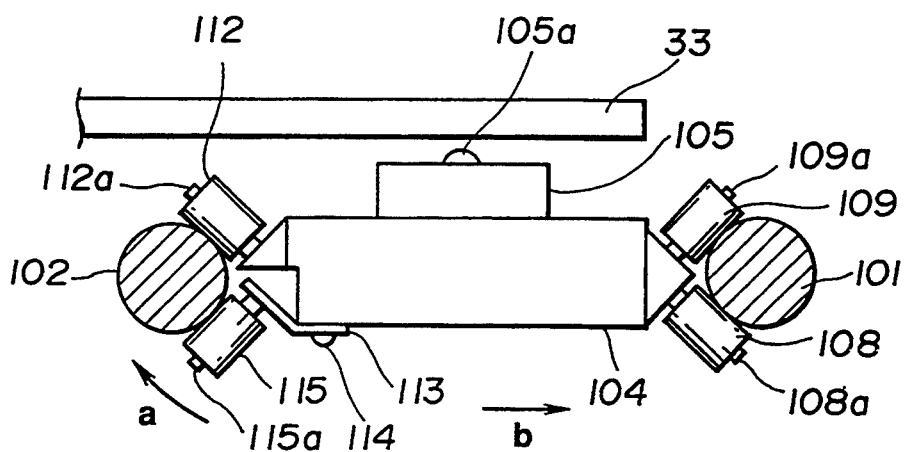
FIG. 1 is a front view showing a conventional supporting system for an optical pickup device, with a portion thereof being broken away.
Figure 2:
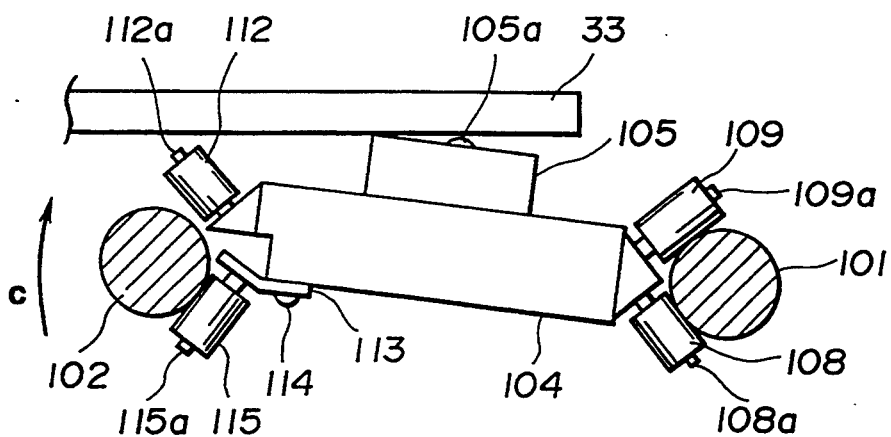
FIG. 2 is a front view of the supporting system of FIG. 1, showing the state in which a shock is applied to the supporting system for the optical pickup device.
Figure 3:
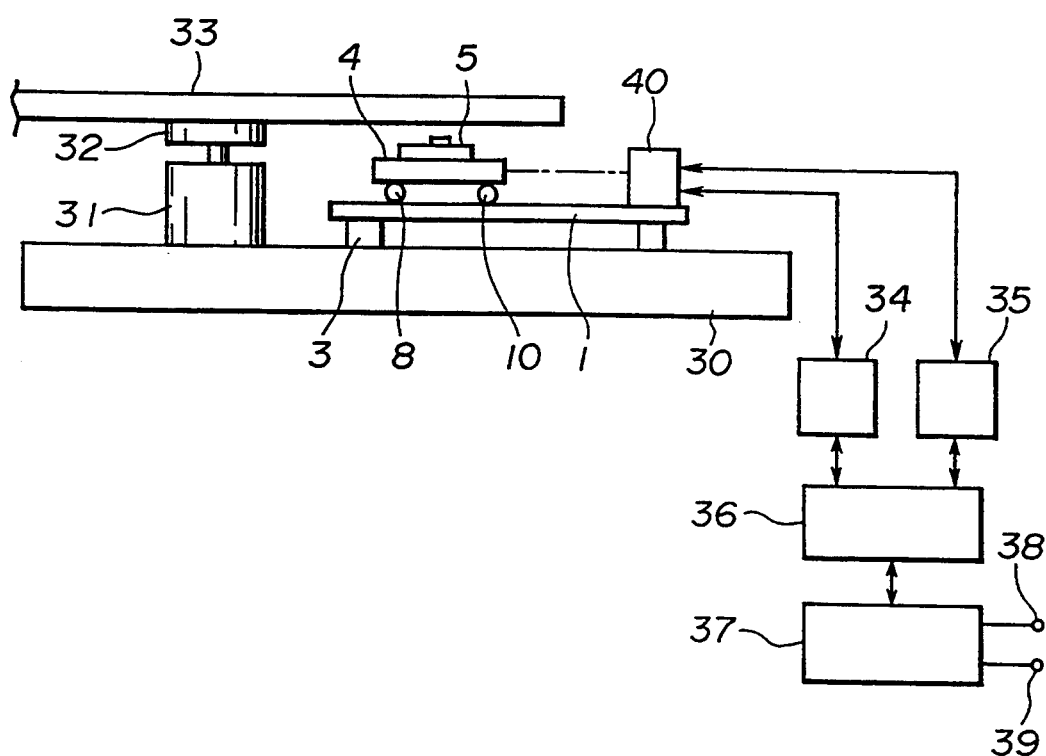
FIG. 3 is a block diagram schematically showing the construction of a recording and/or reproducing apparatus employing the supporting system for the optical pickup device according to the invention.
Figure 4:
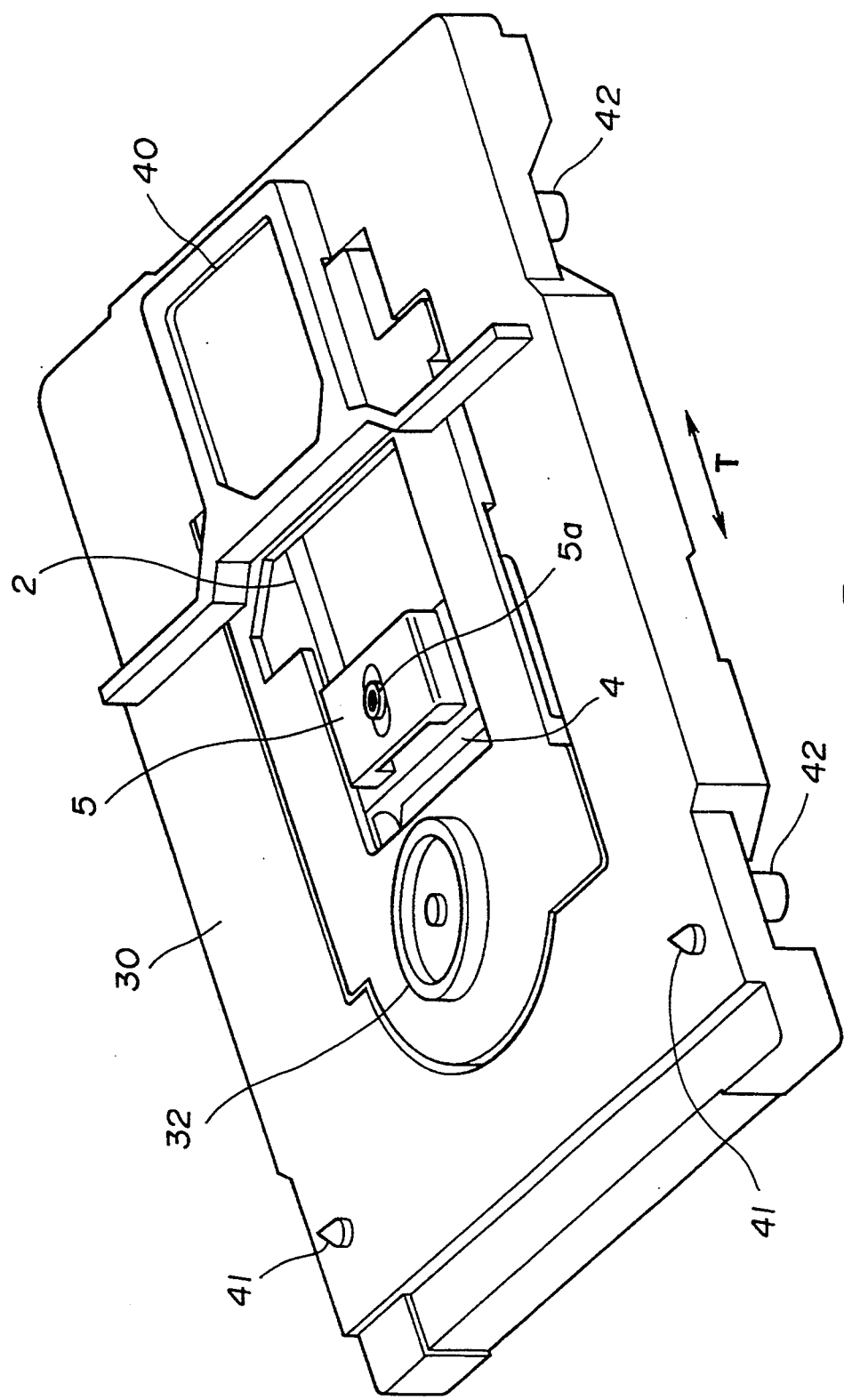
FIG. 4 is a perspective view showing essential parts of the recording and/or reproducing apparatus shown in FIG. 3.

In the present embodiment, the recording/reproducing apparatus records and reproduces information signals using the optical disc a recording medium. Referring to FIGS. 3 and 4, the recording and/or reproducing apparatus comprises a chassis 30, which is formed of a material exhibiting sufficient, toughness, such as metal or synthetic resin, as a substantially flat plate having a center opening. The chassis 30 has posts 42, 42 at four corners on its lower surface for being supported by an outer casing, not shown, of the recording reproducing apparatus. The chassis 30 is housed within the outer casing by having its posts 42, 42 resting on dampers of rubber or an elastic material, not shown, provided within the outer casing.

A spindle motor 31 is mounted on the lower surface of the chassis 30 so that its driving shaft is protruded above the upper surface of the chassis 30 via a throughhole, not shown, provided in the chassis in register with the mounting position of the spindle motor 31.

A disc table 32 is mounted on the distal end of the spindle motor 31. The disc table 32 is supported on the upper surface of the chassis 30 and is disk-shaped so that a chucked part of a center region of the optical disc 33 is set thereon.

A stationary optical block 40 of the optical pickup device is mounted on the chassis 30. The stationary optical block 40 has enclosed therein a light source consisting in a laser diode and an optical device for collimating the light beam radiated from the light source and emitting the thus collimated light beam. The stationary optical block 40 is arranged for emitting the collimated light beam in a direction proceeding towards a driving shaft of the spindle motor 31 in parallel with the chassis 30.

A movable optical block 4, constituting the optical pickup device along with the stationary optical block 40, is also mounted on the chassis 30 at an intermediate position between the spindle motor 31 and the stationary optical block 40. The movable optical block 4 is supported on the chassis 30 by the supporting mechanism for the optical pickup device according to the present invention.

An object lens driving device 5 is mounted on the Upper surface of the movable optical block 4. The object lens driving device 5 includes an object lens 5a which is movably supported for converging and radiating the light beam on the optical disc 33. That is, the object lens driving device 5 has a lens bobbin, not shown, having the object lens 5a attached thereto, a flexible supporting member, not shown, for supporting the lens bobbin and a magnetic circuit section for causing movement of the lens bobbin.

Figure 5:
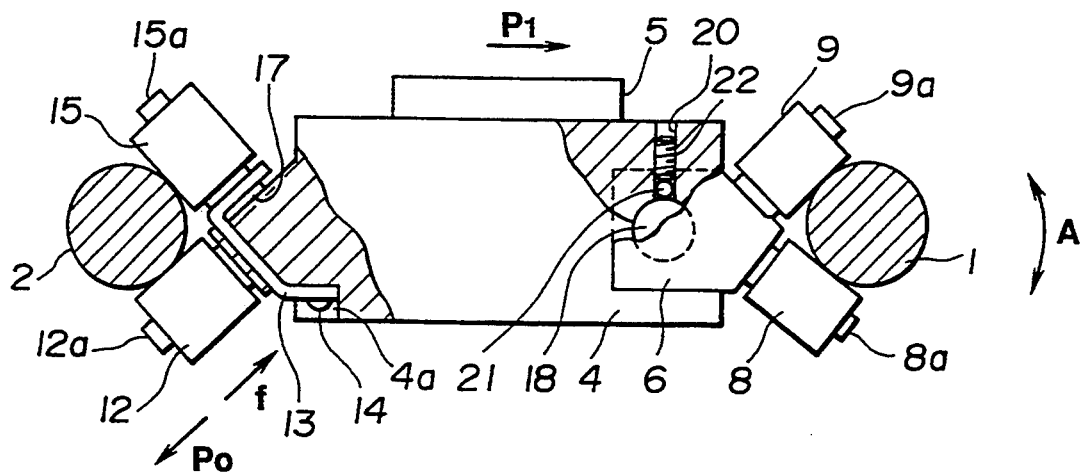
FIG. 5 is a front view showing a supporting system for an optical pickup device according to the present invention, with a portion thereof being broken away.
Figure 6:
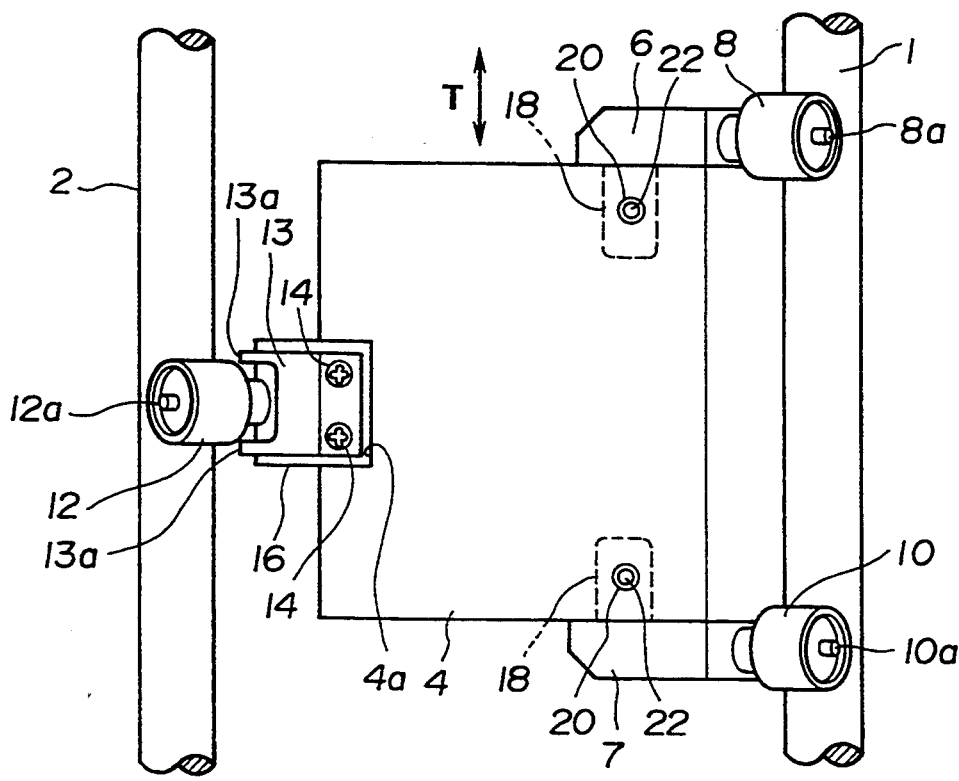
FIG. 6 is a bottom view showing a supporting system for the optical pickup device shown in FIG. 5.
Figure 7:
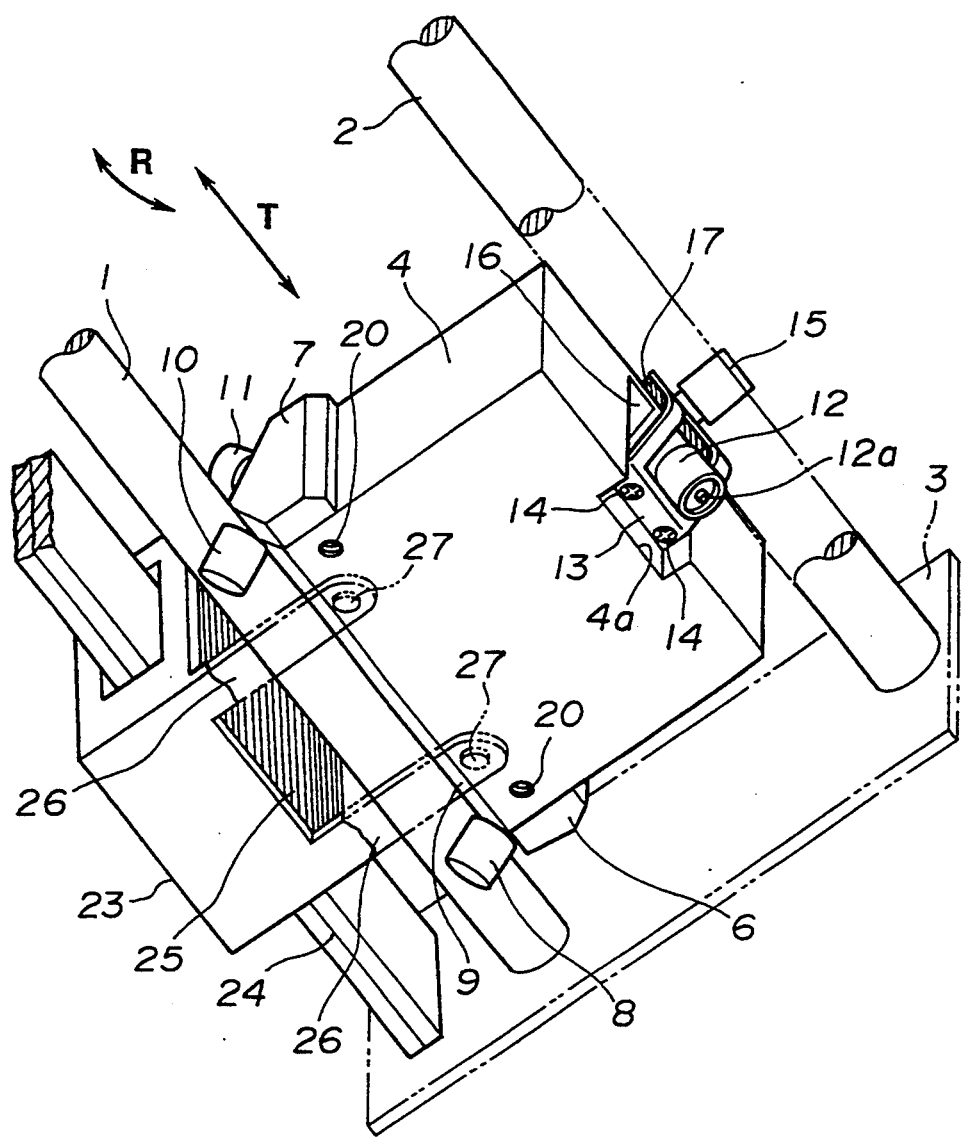
FIG. 7 is a perspective view showing a supporting system for the optical pickup device shown in FIG. 5, as viewed from the bottom side.

The supporting mechanism for the optical pickup device according to the present invention comprises first and second guide shafts 1, 2, arranged parallel to each other, and first to third supporting members mounted on the movable optical block 4 so as to abut on the guide shafts 1, 2 for supporting the movable optical block 4 with respect to the guide shafts 1, 2, as shown in FIGS. 5 to 7.

The first and second guide shafts 1, 2 are arranged parallel to the chassis 30 by having their ends supported by a shaft supporting member 3 arranged on the lower surface of the chassis 30.

As best shown in FIGS. 5-7, inclusive, the abovementioned first supporting members comprise first and second guide rollers 8, 9 mounted at a front side on a lateral surface of the movable optical block 4, and third and fourth guide rollers 10, 11 mounted at a rear side on the same lateral surface of the movable optical block 4.

The above-mentioned second supporting member comprises a fifth guide roller 12 mounted on the opposite lateral surface of the movable optical block 4, while the above-mentioned third supporting member comprises a sixth guide roller 15 mounted on the same opposite lateral surface of the movable optical block 4.

The first and second guide rollers 8, 9 are rotatably supported by supporting shafts 8a, 9a set at an angle of 90° relative to each other on a roller supporting member 6 mounted on the movable optical block 4, as shown in FIG. 5. The roller supporting member 6 has a mounting shaft 18 and is mounted on the movable optical block 4 by having the mounting shaft 18 engaged in an engaging hole, not shown, provided towards a lateral surface on the front surface of the movable optical block 4. See FIGS. 5 and 6. The mounting shaft 18 is supported in pressure contact within the engaging hole, with the interposition of an abutment member 21, by means of a set screw 22 threaded into a tapped hole 20 provided in the movable optical block 4 in communication with the engaging hole.

The third and fourth guide rollers 10, 11 are rotatably supported by supporting shafts 10a, 11a set at an angle of 90° on a roller supporting member 7 mounted on the movable optical block 4. The roller supporting member 7 also has a mounting shaft 18 and is mounted on the movable optical block 4 by having the mounting shaft 18 engaged in an engaging hole, not shown, provided towards the same lateral surface on the rear surface of the movable optical block 4. The mounting shaft 18 is supported in pressure contact within the engaging hole, with the interposition of another abutment member 21, by means of a set screw 22 threaded into tapped hole 20 provided in the movable optical block 4 in communication with the engaging hole.

The first guide roller 8 and the third guide roller 10 have their axes parallel to each other, while the second guide roller 9 and the fourth guide roller 11 have their axes parallel to each other. The first and second guide rollers 8, 9 are caused to bear against the first guide shaft 1 for engaging both sides of the first guide shaft 1. The third and fourth guide rollers 10, 11 are also caused to bear against the first guide shaft 1 for engaging both sides of the first guide shaft 1. That is, the movable optical block 4 is position-controlled by the first to fourth guide rollers 8, 9, 10 and 11 so that only rotation of the optical block 4 about the first guide shaft 1 as a center of rotation and a movement along the axis of the first guide shaft 1 are allowed.

The fifth guide roller 12 is rotatably mounted on a supporting shaft 12a set on the opposite lateral surface of the optical block 4 obliquely downwardly at an angle of 45°, as shown in FIG. 5. The fifth guide roller 12 is caused to bear against the second guide shaft 2 from an obliquely downward side.

The sixth guide roller 15 is rotatably supported on a supporting shaft 15a set on a spring plate 13, as an elastic member, mounted by a set screw 14 on the same opposite lateral surface of the movable optical block 4, as shown in FIGS. 5 to 8. The sixth guide roller 15 is supported by a supporting shaft 15a which is mounted obliquely upwardly at an angle of 90° with respect to the supporting shaft 12a supporting the fifth guide roll 12.

Figure 8:
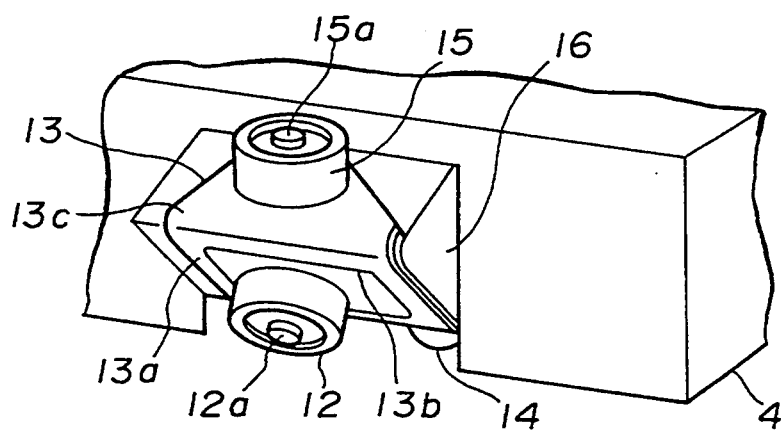
FIG. 8 is an enlarged perspective view showing essential parts of the supporting device for the optical pickup device shown in FIG. 5.

The spring plate 13 has its proximal end mounted in a spring mounting recess 4a formed on the lower surface of the above-mentioned opposite lateral surface of the movable block 4, and is provided along a lateral surface of a spring supporting projection 16 formed on the above-mentioned opposite lateral surface of the movable optical block 4, as shown in FIG. 5. The spring plate 13 has a center aperture 13b in which is inserted the fifth guide roller 12, as shown in FIG. 8. A buffer member 17 is interposed between a distal part 13c of the spring plate 13 carrying the guide roller 15 and the spring supporting projection 16, as shown in FIG. 5. The buffer member 17 serves the purpose of preventing the spring plate 13 from being caused to bear against the spring supporting projection 16 and also preventing excessive resilient deviation of the spring plate 13.

The fifth and sixth guide rollers 12, 15 are caused to bear on the second guide shaft 2 for engaging with both sides of the second guide shaft 2. The sixth guide roller 15 is biased by spring plate 13 towards the second guide shaft 12 as shown by arrow $P_0$ in FIG. 5. The force of reaction to the thrusting force of the sixth guide roller 15 with respect to the second guide shaft 2 is produced in an opposite direction with respect to the thrusting direction, as indicated by arrow f in FIG. 5, for resiliently biasing the movable optical block 4 towards the first guide shaft 1, as indicated by arrow $P_1$ in FIG. 5.

The optical block 4 may be moved along the first and second guide shafts 1, 2, with the guide rollers 8, 9, 10 and 11 in rolling contact with respect to these guide shafts. The direction of possible movement of the optical block 4 along the guide shafts 1, 2 is coincident with the radial direction of the optical disc set on the disc table 32.

The object lens driving device 5 is exposed to a space above the chassis 30 via an opening formed in the chassis 30 between the first and second guide shafts 1 and 2.

The movable optical block 4 has a void space extending from its lateral surface facing the stationary optical block 40 to the upper surface mounting the object lens driving device 5, and a mirror prism, not shown, is provided within this void space. The light beam radiated from the stationary optical block 40 falls in the void space of the movable optical block 4 so as to be deflected by the mirror prism provided in the void space before being incident on the object lens 5a of the object lens driving device 5. The object lens 5a has its optical axis extending substantially at right angles to the chassis 30 for emitting the light beam upwardly in a direction parallel to the optical axis, that is in a direction parallel to the driving shaft of the spindle motor 31.

A linear motor 23 for movement of the movable optical block 4 is provided on the bottom surface of the chassis 30. The linear motor 23 is made up of a coil section 25 attached to the movable optical block 4 by a pair of supporting arms 26, 26 and a magnet section 24 attached to the lower surface of the chassis 30. The magnet section 24 is substantially in the form of a bar having both its ends supported and extends parallel to the first and second guide shafts 1, 2. The coil section 25 is supported by the movable optical block 4 and the magnet section 24 is inserted and mounted in the coil section 25. The linear motor 23 is so designed that, when a predetermined driving current is supplied to the coil section 25, a driving force is generated for driving the coil section 25 in a direction along the length of the magnet section 25 shown by arrow T in FIG. 7 under the interaction between the magnetic field emanated from the coil section 25 and the magnetic field emanated from the magnet section 24.

In the above-described recording and/or reproducing apparatus, provided with the supporting system for the optical pickup device according to the present invention, the optical disc 33 is set on and supported by the disc table 32 and rotationally driven by the spindle motor 31 along with the disc table 32. A light beam is radiated and converged by the optical pickup device on the signal recording surface of the optical disc 33 by means of the object lens 5a for recording and/or reproducing information signals on or from the optical disc 33. The light beam may be radiated on the entire region of the signal recording surface by the movable optical block 4 being moved radially of the optical disc 33 by the linear motor 23.

In the recording and/or reproducing apparatus, information signals are supplied from outside via an input terminal 38 and an interface 37, as shown in FIG. 3. These information signals are modulated by a signal processing unit (CPU) 36 and a modulation circuit 35 so as to be recorded on the optical disc 33 by means of the optical pickup device. In the present recording and/or reproducing apparatus, information signals recorded on the optical disc 33 are read by the optical pickup device and demodulated by the demodulating circuit 35 and the signal processing unit 36 so as to be outputted to outside for reproduction by means of an interface 37 and an output terminal 39.

It is noted that the signal processing unit 36 controls the operation of the optical pickup device and the spindle motor 31 etc. via a controlling circuit 34.

Meanwhile, in the above-described supporting system for the optical pickup device, rotation of the movable optical block 4 around the first guide shaft 1 towards an upper side of the movable optical block provided with the object lens 5a as indicated by arrow A in FIG. 5 is inhibited by the fifth guide roll 12 resting on the lower side of the second guide shaft 2. Consequently, in the present movable optical block 4, there is no risk of the movable optical block being upwardly rotated around the first guide shaft 1 as the center of rotation, even if vibration or shock is propagated thereto from outside the recording and/or reproducing apparatus. That is, there is no risk that, in the present movable optical block 4, the object lens 5a etc. will be caused to bear on the optical disc 33.

On the other hand, in the present supporting system for the optical pickup device, there is no risk of the object lens 5a etc. being caused to bear on the optical disc 33 even if an adjustment opening etc. for position adjustment of the mirror prism etc. housed within the movable optical block 4 is provided on the lower surface of the movable optical block 4.

That is, such position adjustment of the mirror prism etc. via the adjustment opening is carried out from the underside of the movable optical block 4, using an adjustment jig, such as a screwdriver, while the optical disc 33 is kept in rotation. In the present supporting system for the optical pickup device, since the movable optical block 4 is not rotated towards the optical disc 33, around the first guide shaft 1, even if the movable optical block 4 is thrust upwardly by the adjustment jig during such position adjustment, there is no risk of the object lens 5a etc. being contacted with the optical disc 33. Consequently, with the present supporting system for the optical pickup device, the above-mentioned position adjustment may be carried out smoothly and reliably.

What is claimed is:

1. A supporting mechanism for supporting an optical pickup device for movement radially of an optical recording medium, comprising
    a first guide shaft,
    a second guide shaft mounted parallel to the first guide shaft,
    first supporting members provided on a lateral surface of an optical block of the optical pickup device mounting an object lens on an upper surface of the optical block for radiating a light beam to the optical recording medium, the first supporting members including first and second guide rollers rotatably mounted on a front side on a lateral surface of the optical block and third and fourth guide rollers rotatably mounted on a rear side on the lateral surface of the optical block, the first supporting members controlling the position of the optical block by being abutted on the first guide shaft for permitting the optical block to be moved only in a direction around the first guide shaft and in a direction along an axis of the first guide shaft,
    a second supporting member provided on an opposite lateral surface of the optical block, the second supporting member including a fifth guide roller rotatably mounted on an opposite side of the optical block from the first, second, third and fourth guide rollers for abutting on the second guide shaft to prevent rotation of the optical block around the first guide shaft towards the upper surface of the optical block and opposite a direction that gravity urges the optical block,
    a spring plate having one proximal end mounted on a lower surface portion on the opposite lateral surface of the optical block, the spring plate extending along a spring supporting projection formed on the opposite lateral surface of the optical block up toward the upper surface of the optical block, and wherein the spring plate includes a center aperture in which is inserted the fifth guide roller, and
    a third supporting member provided on the opposite lateral surface of the optical block via the spring plate, the third supporting member controlling the position of the optical block by being abutted on the second guide shaft for permitting the optical block to be moved only in a direction that gravity urges the optical block around the first guide shaft and which moves the optical head away from the optical recording medium and in a direction along an axis of the first guide shaft, the third supporting member including a sixth guide roller positioned adjacent the upper surface of the optical block for being thrust against the second guide shaft for resiliently biasing the optical block in a direction from the second guide shaft towards the first guide shaft.

2. The supporting mechanism for the optical pickup device as claimed in claim 1, wherein the spring plate has one proximal end mounted on a lower surface portion on the opposite lateral surface of the optical block and another, free end which extends at least as high as an upper extremity of the second guide shaft, the spring plate extending along a spring supporting projection of the optical block formed on the opposite lateral surface of the optical block up toward the upper surface of the optical block.

3. The supporting mechanism for the optical pickup device as claimed in claim 2, wherein the sixth guide roller is supported for rotation around a supporting shaft set on the free end of the spring plate.

4. The supporting mechanism for the optical pickup device as claimed in claim 2, wherein a buffer member is interposed between the spring supporting projection and a distal part of the spring plate carrying the sixth guide roller, the buffer member preventing the spring plate from bearing against the spring supporting projection and also preventing excessive resilient deviation of the spring plate.

5. The supporting mechanism for the optical pickup device as claimed in claim 1, further comprising a first roller supporting member attaching the first guide roller and the second guide roller to the optical block, the first roller supporting member including a shaft parallel to the first and second guide shafts which is pivotally received in a bore in the optical block and a set screw means which engages the shaft at a desired pivotal adjustment position relative to the first guide shaft and the optical block, thereby permitting adjustment of the first roller supporting member carrying the first and second rollers with respect to the third and fourth rollers.

6. The supporting mechanism for the optical pickup device as claimed in claim 5, further comprising a second roller supporting member attaching the third guide roller and the fourth guide roller to the optical block, the second roller supporting member including a shaft parallel to the first and second guide shafts which is pivotally received in a bore in the optical block and a set screw means for engaging the shaft at a desired pivotal adjustment position relative to the first guide shaft and the optical block, thereby permitting adjustment of the object lens height and alignment with respect to the optical recording medium.

7. A supporting mechanism for supporting an optical pickup device for movement radially of an optical recording medium, comprising:
    a first guide shaft;
    a second guide shaft mounted parallel to the first guide shaft;
    first supporting members provided on a side of an optical block of the optical pickup device mounting an object lens on an upper surface of the optical block for radiating a light beam to the optical recording medium, the first supporting members including a pair of first and second guide rollers rotatably mounted on a front side on a lateral surface of the optical block and pair of third and fourth guide rollers rotatably mounted on a rear side on the lateral surface of the optical block, the first supporting members controlling position of the optical block by being abutted on the first guide shaft for permitting the optical block to be moved only in a direction around the first guide shaft and in a direction along an axis of the first guide shaft;

a second supporting member provided on an opposite lateral surface of the optical block, the second supporting member including a fifth guide roller rotatably mounted on an opposite side of the optical block from the first, second, third and fourth guide rollers for abutting on the second guide shaft to prevent rotation of the optical block around the first guide shaft towards the upper surface of the optical block;

a spring plate having one proximal end mounted on a lower surface portion on the opposite lateral surface of the optical block, the spring plate extending along a spring supporting projection formed on the opposite lateral surface of the optical block up toward the upper surface of the optical block, wherein the spring plate has a proximal end mounted in a spring mounting recess formed on a lower surface portion of the opposite lateral surface of the optical block, and is provided along a lateral surface of a spring mounting projection formed on the opposite lateral surface of the optical block, and wherein the spring plate includes a center aperture in which is inserted the fifth guide roller; and a third supporting member provided on the opposite lateral surface of the optical block via the spring plate, the third supporting member controlling the position of the optical block by being abutted on the second guide shaft for permitting the optical block to be moved only in a direction around the first guide shaft which moves the optical head away from the optical recording medium and in a direction along an axis of the first guide shaft, the third supporting member including a sixth guide roller positioned adjacent the upper surface of the optical block for being thrust against the second guide shaft for resiliently biasing the optical block in a direction from the second guide shaft towards the first guide shaft.

8. The supporting mechanism for the optical pickup device as claimed in claim 7, wherein a buffer member is interposed between the spring mounting projection and a distal part of the spring plate carrying the sixth guide roller, the buffer member preventing the spring plate from bearing against the spring mounting projection and also preventing excessive resilient deviation of the spring plate.

* * * * *